United States Patent
Kudou et al.

(10) Patent No.: US 6,798,091 B2
(45) Date of Patent: Sep. 28, 2004

(54) WATERTIGHT BRUSHLESS FAN MOTOR

(75) Inventors: Naruhiko Kudou, Nagano (JP); Hisashi Takizawa, Nagano (JP); Osamu Kawakami, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 4 days.

(21) Appl. No.: 10/306,933

(22) Filed: Nov. 29, 2002

(65) Prior Publication Data

US 2003/0173851 A1 Sep. 18, 2003

(30) Foreign Application Priority Data

Nov. 29, 2001 (JP) ........................................ 2001-364578

(51) Int. Cl.[7] ................................................. H02K 1/04
(52) U.S. Cl. .......................................... 310/43; 310/87
(58) Field of Search .............................. 310/43, 87, 88, 310/154.44

(56) References Cited

U.S. PATENT DOCUMENTS 4,128,527 A * 12/1978 Kinjo et al. .................. 310/43
4,387,311 A * 6/1983 Kobayashi et al. ........... 310/43
6,359,354 B1 * 3/2002 Watanabe et al. ............. 310/87
6,437,464 B1 * 8/2002 Neal ........................... 310/43
6,445,095 B1 * 9/2002 Liang et al. .................. 310/64

FOREIGN PATENT DOCUMENTS

JP          10-191611          7/1998

* cited by examiner

Primary Examiner—Dang Le
Assistant Examiner—Nguyen Hanh
(74) Attorney, Agent, or Firm—Rankin, Hill, Porter & Clark LLP

(57) ABSTRACT

In a watertight brushless fan motor of the present invention, a first pad 33 is disposed in a first space between a stator 1 and a circuit substrate 3, A second pad 35 is disposed in a second space between the circuit substrate 3 and a plate-like section 7c of a case 7. Spaces between the plate-like section 7c of the case 7 and a bearing supporting cylindrical section 7a are formed with an insulating resin in such a manner that the stator 1 and the circuit substrate 3 are included inside, thereby forming a molded part 31, With this arrangement, the watertight brushless fan motor is provided that can prevent occurrence of a crack in the outer surface of the molded part due to the so-called molding shrinkage of the insulating resin or expansion and shrinkage of the insulating resin caused by a change in ambient temperature.

9 Claims, 5 Drawing Sheets

WATERTIGHT BRUSHLESS FAN MOTOR

BACKGROUND OF THE INVENTION

The present invention relates to a watertight brushless fan motor and a manufacturing method thereof.

Generally, brushless fan motors include a stator provided with a plurality of stator magnetic poles, a circuit substrate fixed to the stator, a rotor for rotating with respect to the stator, and a case. The case includes a bearing supporting cylindrical section in which a bearing for rotatably supporting the rotary shaft of the rotor is received, a cylindrical housing section for surrounding the outer periphery of the rotor, a plate-like section separated from the circuit substrate with a predetermined space and extending from the end of the bearing supporting cylindrical section in a direction perpendicular to the center line of the bearing supporting cylindrical section, and a plurality of webs for connecting the plate-like section to the housing section. In the brushless fan motor of this type, it is required that the stator and the circuit substrate be made watertight. Then, as disclosed in Japanese Patent Application Laid-Open Publication No. 191611/1998, a watertight brushless fan motor has been proposed in which spaces between the plate-like section and the bearing supporting cylindrical section of the case are formed with an insulating resin in such a manner that the stator and the circuit substrate are included inside, thereby forming a molded part.

However, in this conventional watertight brushless fan motor, when the insulating resin is molded, the insulating resin shrinks due to what is called a molding shrinkage or molding sink, or expands or shrinks due to a change in ambient temperature, thereby causing a crack in the outer surface of the molded part.

It is therefore an object of the present invention is to provide a watertight brushless fan motor which can prevent occurrence of a crack in the outer surface of a molded part caused by shrinkage of an insulating resin resulting from the molding shrinkage, or expansion and shrinkage of the insulating resin due to a change in ambient temperature, and a manufacturing method of the watertight brushless fan motor.

It is another object of the present invention to provide a watertight brushless fan motor in which an insulating resin can be molded, with the center line of the cylindrical body of the die of a resin mold aligned over the center line of the bearing supporting cylindrical section of the case, and a manufacturing method of the watertight brushless fan motor.

SUMMARY OF THE INVENTION

A watertight brushless fan motor, the improvement of which is aimed at in the present invention, includes: a stator provided with a plurality of stator magnetic poles, each of which has a winding wound around each of a plurality of projecting pole portions of an iron core constituted by a plurality of laminated steel plates; a circuit substrate mounted with electronic components constituting a control circuit for controlling a current flow through the winding, fixed to the stator, and spaced from the projecting pole portions at a predetermined distance; a rotor including a plurality of rotor magnetic poles, each of which is made of a permanent magnet, on an inner peripheral side thereof and including a plurality of blades on an outer peripheral side thereof; a case; one or more pads; and a molded part. The case includes a bearing supporting cylindrical section in which a bearing for rotatably supporting the rotary shaft of the rotor is received, a cylindrical housing section for surrounding the outer periphery of the blades of the rotor, a plate-like section extending from the end of the bearing supporting cylindrical section in a direction perpendicular to the center line of the bearing supporting cylindrical section with a predetermined space formed between the plate-like section and the circuit substrate, and a plurality of webs for connecting the plate-like section to the housing section. One or more pads are disposed in at least one of a first space between the stator and the circuit substrate and a second space between the circuit substrate and the plate-like section of the case, and made of an electrical insulating material. The one or more pads occupy the main portion of one of these spaces or both. The molded part is formed with an insulating resin in such a manner that the stator, the circuit substrate, and the one or more pads are included therein. Incidentally, at least one of the first and second spaces has such a capacity that a molding shrinkage occurs in the surface of the molded part when the molded part is filled with the insulating resin alone.

Generally, when the insulating resin is molded, the insulating resin in the molded part with an increased thickness is pulled toward the center of the molded part at the time of curing. Consequently, a phenomenon in which the outer surface of the molded part is transformed, or a molding shrinkage occurs. At a boundary between portions of the molded part of different thickness, when the insulating resin has expanded or shrunk due to a change in ambient temperature, a crack occurs in the outer surface of the molded part. Then, according to the present invention, if a pad is disposed in at least one of the first space between the stator and the circuit substrate and the second space between the circuit substrate and the plate-like section of the case, the thickness of the molded part can be reduced. With this arrangement, the molding shrinkage of the insulating resin at the time of curing can be reduced. Further, the pad can reduce an unbalance in the thickness of the insulating resin of the molded part. For this reason, the amount of expansion and shrinkage of the insulating resin due to a change in ambient temperature can be reduced, thereby allowing prevention of occurrence of a crack in the outer surface of the molded part.

Since the first space formed between the stator and the circuit substrate, in particular, is adjacent to the rotor, the molded part is formed according to the shape of the rotor. Thus, formation of portions of the molded part of different thickness is apt to occur. For this reason, it is desirable to dispose one or more pads that prevent occurrence of a crack in the outer surface of the molded part due to expansion and shrinkage of the insulating resin.

Generally, in the watertight brushless fan motor, the improvement of which is aimed at according to the present invention, the molded part includes a first molded part having the stator and a second molded part having such a shape and dimension as to include the circuit substrate and form a step portion for the first molded part. In this case, since the step portion is formed at a boundary between the first molded part and the second molded part, a crack is apt to occur notably at this boundary. Consequently, it is preferable that the shapes and the dimensions of one or more pads disposed in the first space are defined so as to suppress occurrence of a crack at the boundary between the first molded part and the second molded part due to expansion and shrinkage of the insulating resin. Specifically, one or more pads disposed in the first space are constituted by a single first pad. The first pad includes a cylindrical section fitted into the bearing supporting cylindrical section and a plate-like section extending radially outward from the cylindrical section. The plate-like section is formed with a plurality of slits into which part of the windings of the stator magnetic poles are inserted. With this arrangement, only by inserting the cylindrical section into the bearing supporting cylindrical section of the case, the first pad can be disposed generally across the entire first space. Thus, just a simple-shaped pad can enhance the effect of preventing the molding shrinkage. At the end of the plate-like section located radially outward, curved surface extended sections are integrally formed extending both in a circumferential direction of the bearing supporting cylindrical section and in a center line direction of the bearing supporting cylindrical section and have curved surfaces respectively curved along magnetic pole faces of the projecting pole portions. With this arrangement, the insulating resin is thinly molded on the curved surface extended sections, thereby allowing effective prevention of occurrence of a crack at the boundary between the first molded part and the second molded part. In this case, the length of the curved surface extended sections in the center line direction may be the length corresponding to a portion of the first molded part facing the rotor, positioned on the side of the circuit substrate rather than on the side of the iron core.

One or more pads disposed in the second space can be constituted by a single second pad. In this case, the second pad may include a cylindrical section fitted into the bearing supporting cylindrical section and a plate-like section extending radially outward. With this arrangement, only by fitting the cylindrical section into the bearing supporting cylindrical section of the case, the second pad can be disposed generally across the entire second space. Thus, just a simple-shaped pad can enhance the effect of preventing the molding shrinkage. When a part of the electronic components are mounted at the back of the circuit substrate facing the plate-like section of the case, at least one through hole for letting an electronic component large in size and dimension pass therethrough may be formed in the plate-like section of the second pad so as to facilitate positioning of the second pad.

Various materials can be employed for the insulating resin. However, if an urethane resin is employed, a curing time can be reduced, and a watertight effect can be obtained at low cost.

In a manufacturing method of a watertight brushless fan motor, first, a stator assembly combining a stator and a circuit substrate, a case, a die, and an annular member are prepared. The case includes a bearing supporting cylindrical section, a plate-like section extending from the end of the bearing supporting cylindrical section in a direction perpendicular to the center line of the bearing supporting cylindrical section and an outside cylindrical section extending from the outer end of the plate-like section in a direction of the center line of the bearing supporting cylindrical section along the bearing supporting cylindrical section. The die includes a cylindrical body and a blockage wall having an engaging portion that can be engaged with the bearing supporting cylindrical section, for blocking one opening of the cylindrical body. The other opening of the cylindrical body is blocked by the plate-like section and the outside cylindrical section of the case with the die being fixed to the case. The annular member is made of a resin and is mounted or fitted to the die. When the die is fixed to the case, the annular member aligns the center line of the cylindrical body of the die over the center line of the bearing supporting cylindrical section with the inner peripheral end surface of the annular member being brought into contact with the outer peripheral surface of the outside cylindrical section.

Then, the stator assembly is mounted on the bearing supporting cylindrical section of the case. Next, the bearing supporting cylindrical section is engaged with the engaging portion, the inner peripheral end surface of the annular member is brought into close contact with the outer peripheral surface of the outer cylindrical section of the case, and then the die mounted with the annular member is attached to the case. Next, the die and the annular member are fixed to the case. Then, an insulating resin is poured into the die to mold spaces between the plate-like section and the bearing supporting cylindrical section with the insulating resin in such a manner that the stator and the circuit substrate are included inside. According to the method of the present invention for molding with a resin, the annular member made of a resin can shield the die and the outside cylindrical section of the case. In addition, the insulating resin can be molded by aligning the center line of the cylindrical body of the die over the center line of the bearing supporting cylindrical section. For this reason, it is possible to prevent contact of the insulating resin into the rotor due to misalignment between the center line of the cylindrical body of the die and the center line of the bearing supporting cylindrical section.

In this case, in order to perform molding, in at least one of the first space between the stator and the circuit substrate and the second space between the circuit substrate and the plate-like section of the case, one or more pads made of an electrical insulating material for occupying the main portion of one of these spaces or both should be disposed.

Further, it is preferable to perform molding by pouring the resin under low vacuum. With this arrangement, molding can be performed with no air bubbles remaining therein.

According to the present invention, a pad is disposed in at least one of the first space between the stator and the circuit substrate and the second space between the circuit substrate and the plate-like section of the case. Thus, the thickness of the molded part can be reduced. For this reason, a molding shrinkage at the time of curing of the insulating resin can be reduced. Further, an unbalance of the thickness of portions of the molded part made of the insulating resin can be reduced. Hence, the amount of expansion and shrinkage of the insulating resin due to a change in ambient temperature can be reduced, thereby allowing prevention of occurrence of a crack in the outer surface of the molded part

BRIEF DESCRIPTION OF THE DRAWINGS

These and other objects and many of the attendant advantages of the present invention will be readily appreciated as the same becomes better understood by reference to the following detailed description when considered in connection with the accompanying drawings; wherein.

DETAILED DESCRIPTION OF THE PREFERRED EMBODIMENTS

Figure 1:
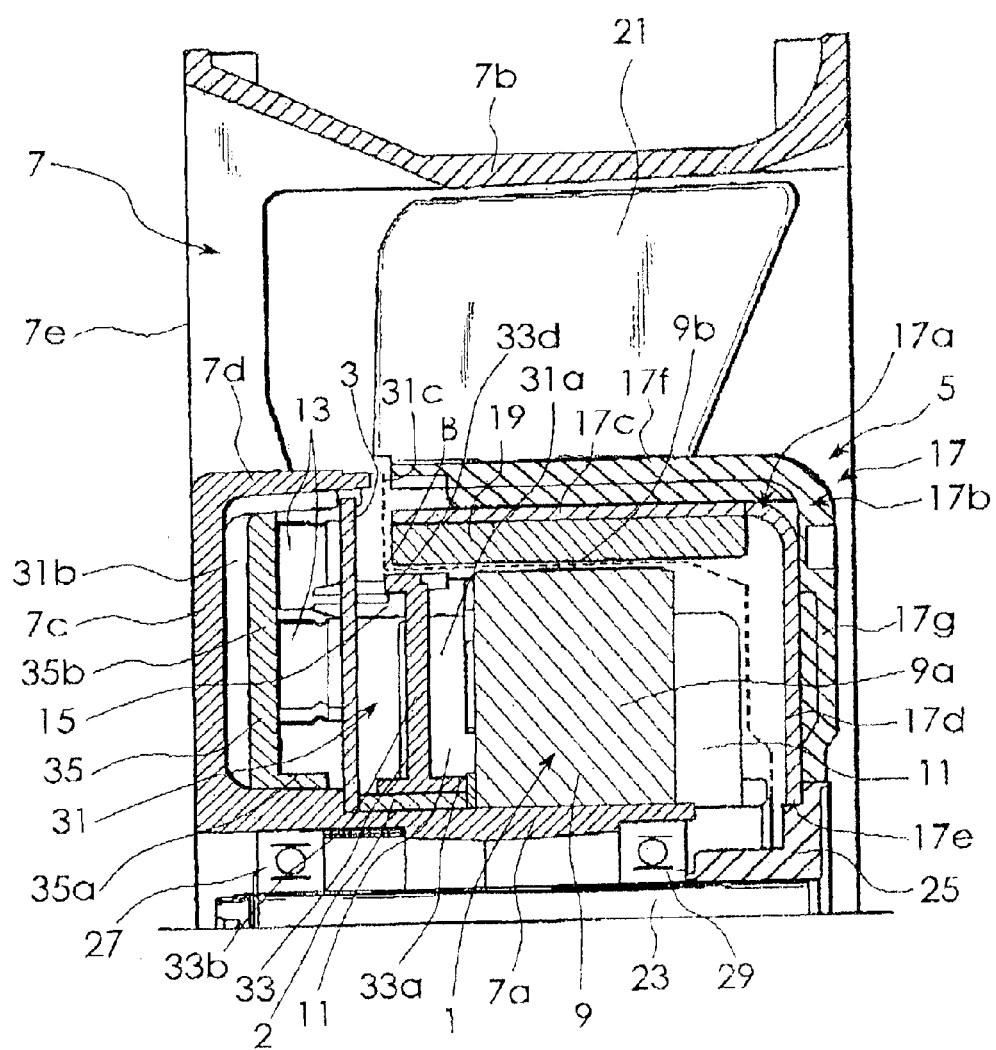
FIG. 1 is a vertical cross sectional view showing a half portion of a watertight brushless fan motor according to an embodiment of the present invention.

An embodiment of the present invention will be described in detail with reference to the accompanying drawings. FIG. 1 is a vertical cross sectional view showing a half portion of a watertight brushless fan motor according to the embodiment of the present invention. As shown in FIG. 1, the brushless fan motor according to this embodiment includes a stator 1, a circuit substrate 3, a rotor 5, and a case 7. The stator 1 includes an iron core 9 constituted by laminating a plurality of steel plates. The iron core 9 includes a plurality of projecting pole portions 9a arranged in a circumferential direction. A winding 11 is wound around each projecting pole portion 9a of the iron core 9, thereby constituting the stator 1. These projecting pole portions 9a function as stator magnetic poles when the winding 11 is excited. Accordingly, the tip end surface of each projecting pole portion 9a becomes a pole face 9b of each stator magnetic pole.

The circuit substrate 3 is fixed to the stator 1. A plurality of electronic components 13 constituting a control circuit for controlling a current flow through the winding 11 are mounted at the back of the circuit substrate 3. The winding 11 constitutes part of the stator magnetic poles of the stator 1 The circuit substrate 3 faces a flat portion 7c of the case 7, which will be described below. The lead wire of the winding 11 is electrically connected to the control circuit on the circuit substrate 3. The lead wire of the winding 11 passes through the through hole of the circuit substrate 3 and is wound around and soldered to a terminal pin 15 which is furthermore soldered to the electrode on the circuit substrate 3.

The rotor 5 includes a rotor side case 17 and a rotary shaft 23. The rotor side case 17 includes a cup member 17a made of a magnetic material and a blade mounting hub 17b fitted on the outside of the cup member 17a. The cup member 17a includes a cylindrical section 17c and a bottom wall section 17d. The cylindrical section 17c has a plurality of rotor magnetic poles 19, each of which is made of a permanent magnet, fixed to the inner peripheral portion so that they are arranged in the circumferential direction. The bottom wall section 17d blocks one end of the cylindrical section 17c. At the center of the bottom wall section 17d is formed a through hole in which a bush 25 described below is fitted. The blade mounting hub 17b includes the cylindrical section 17f having a plurality of blades 21 fixed to the outer peripheral portion thereof and a bottom wall portion 17g that blocks one end of the cylindrical section 17f. To the center of the bottom wall portion 17g is fixed the bush 25 for fixing the rotor side case 17 to the rotary shaft 23.

The case 7 includes a bearing supporting cylindrical section 7a, a housing section 7b, a plate-like section 7c, an outside cylindrical section 7d, and a plurality of webs 7e. In the bearing supporting cylindrical section 7a, two bearings 27 and 29 for rotatably supporting the rotary shaft 23 of the rotor 5 are received. The housing section 7b is of a cylindrical shape and surrounds the outer peripheral portion of the blades 21 of the rotor 5. The plate-like section 7c is coupled to the bearing supporting cylindrical section 7a, The outside cylindrical section 7d extends from the outer end of the plate-like section 7c in the direction of the center line of the bearing supporting cylindrical section 7a, along the bearing supporting cylindrical section 7a. The webs 7e couples the plate-like section 7c and the outside cylindrical section 7d to the housing section 7b. These components are integrally formed with a resin. The plate-like section 7c extends from the end of the bearing supporting cylindrical section 7a in the direction perpendicular to the center line of the bearing supporting cylindrical section 7a, with a predetermined space formed between the plate-like section 7c and the circuit substrate 3. The webs 7e are arranged at intervals in the circumferential direction. On one of the webs 7e is formed a lead wire receiving groove for receiving a plurality of lead wires connected to the control circuit of the circuit substrate 3 and for guiding them to the side of the housing section 7b.

On the bearing supporting cylindrical section 7a of the case 7, a molded part 31, which is transparent in FIG. 1 and the outline of which is indicated by a dashed line, is formed of an insulating resin made of an urethane resin in such a manner that the stator 1 and the circuit substrate 3 are included inside. The molded part 31 is constituted by a first molded part 31a including the stator 1 and a second molded part 31b including the circuit substrate 3. The second molded part 31b has such a shape and dimension as to form a step section 31c between the first molded part 31a and the second molded part 31b. On a portion adjacent to the step section 31c with a predetermined gap, the ends of the rotor side case 17 and the rotor magnetic poles 19 of the rotor 5 are disposed. In a first space between the stator 1 included in the first molded part 31a and the circuit substrate 3, a first pad 33 for occupying the main portion of the first space is disposed, while in a second space between the circuit substrate 3 included in the second molded part 31b and the plate-like section 7c of the case 7, a second pad 35 for occupying the main portion of the second space is disposed. The first pad 33 and the second pad 35 are both formed of an electrical insulating material made of a PBT resin, and their shapes and dimensions are defined so that it is possible to suppress occurrence of a crack on the outer surface of the molded part 31 due to expansion and shrinkage of the insulating resin at the time of molding.

Figure 2A:
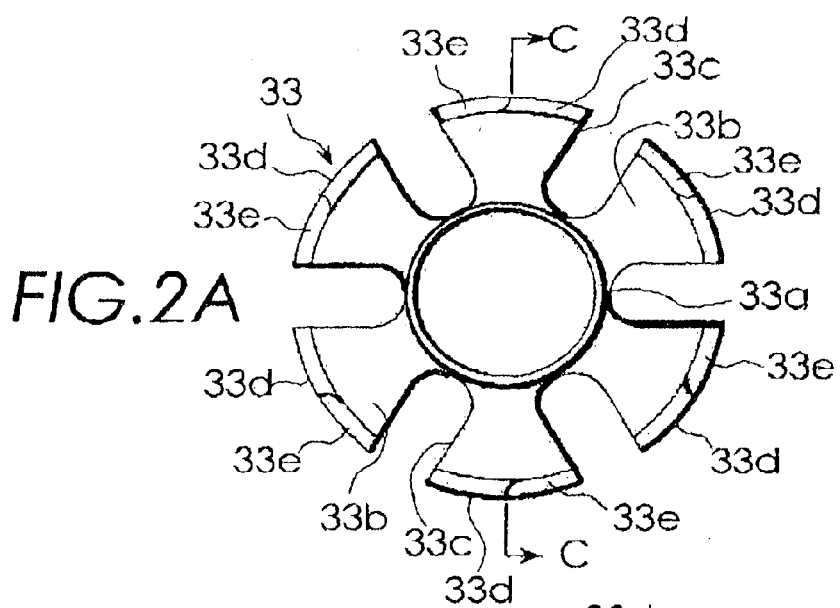
FIGS. 2A, 2B, and 2C are a top view, a side view, and a partial sectional view showing a first pad employed for the watertight brushless fan motor illustrated in FIG. 1.
Figure 2B:
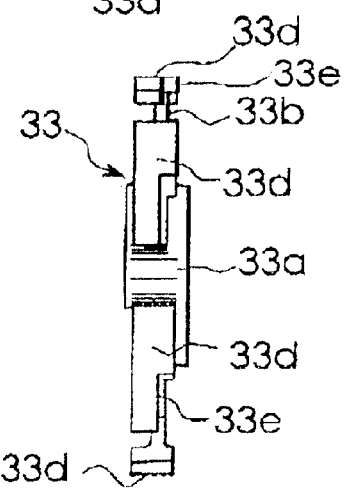
Figure 2C:
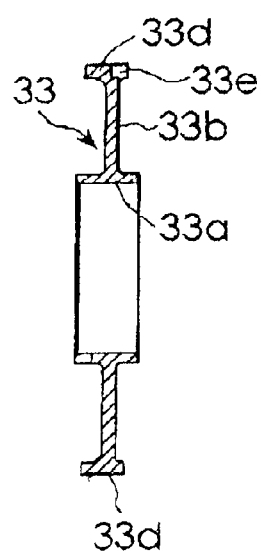

As illustrated in FIGS. 2A to 2C, the first pad 33 includes a cylindrical section 33a and a plate-like section 33b, The cylindrical section 33a is fitted into the bearing supporting cylindrical section 7a of the case 7 through an insulator 2 (FIG. 1). The plate-like section 33b extends radially outward from a position substantially in the middle of the center line of the cylindrical section 33a. The plate-like section 33b is formed with a plurality of slits 33c, into which part of a plurality of the windings 11 wound around the projecting pole portions 9a are respectively inserted. At the end of the plate-like section 33b located radially outward, a plurality of curved surface extended sections 33d are integrally formed. The curved surface extended sections 33d extend both in the circumferential direction of the bearing supporting cylindrical section 7a and in the center line direction of the bearing supporting cylindrical section 7a and have curved surfaces respectively curved along the pole faces 9b of the projecting pole portions 9a. In a plurality of the curved surface extended portions 33d, cutout portions 33c are respectively formed over a half of the end of the plate-like sections 33b in the circumferential direction so that the insulating resin can easily flow into regions respectively surrounded by the curved surface extended sections 33d, the plate-like section 33b, and the cylindrical section 33a at the time of molding. The length (width dimension) of the curved surface extended sections 33d in the center line direction thereof is set to the one substantially corresponding to the portion of the first molded part 31a facing the rotor 5, positioned on the side of the circuit substrate 3 rather than on the side of the iron core 9. With this arrangement, the insulating resin is thinly molded on the curved surface extended sections 33d, thereby allowing effective prevention of a crack that will occur at a boundary B between the first molded part 31a and the second molded part 31b due to expansion or shrinkage of the insulating resin.

Figure 3A:
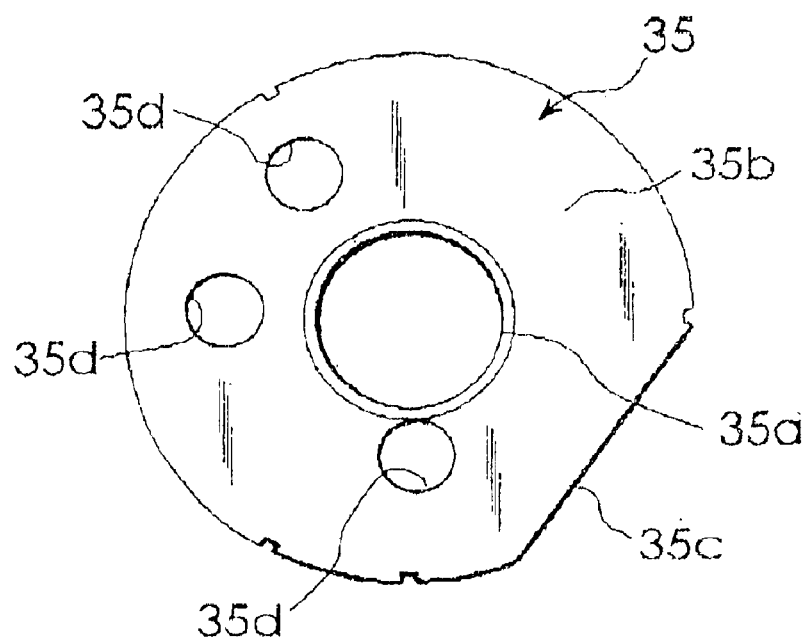
FIGS. 3A and 3B are a top view and a partial sectional view showing a second pad for the watertight brushless fan motor illustrated in FIG. 1.
Figure 3B:
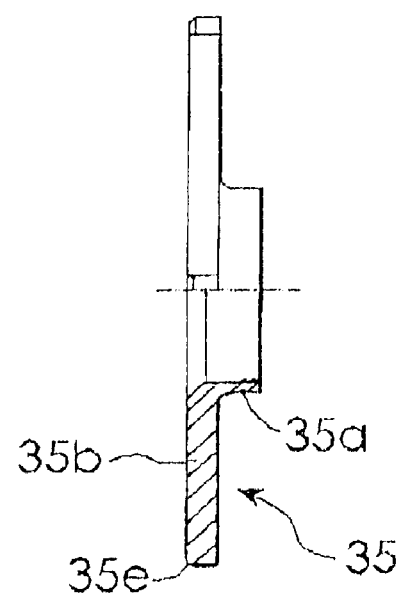

As illustrated in FIGS. 3A and 3B, the second pad 35 Includes a cylindrical section 35a and a plate-like section 35b that have been integrally formed. The cylindrical section 35a is fitted into the bearing supporting cylindrical section 7a of the case 7. The plate-like section 35b extends radially outward from one end of the cylindrical section 35a. The second pad 35 is disposed so that the other end of the cylindrical section 35a faces the circuit substrate 3 to form a gap between the plate-like section 35b and the circuit substrate 3. The outline of the plate-like section 35b is nearly a circle partially having a straight line 35c. Three through holes 35d for passing electronic components large in size and dimension, mounted on the circuit substrate 3, are formed in the plate-like section 35b. Further, at the edges of the plate-like section 35b on the side opposite to the circuit substrate 3 are formed curved portion 35e.

Figure 4:
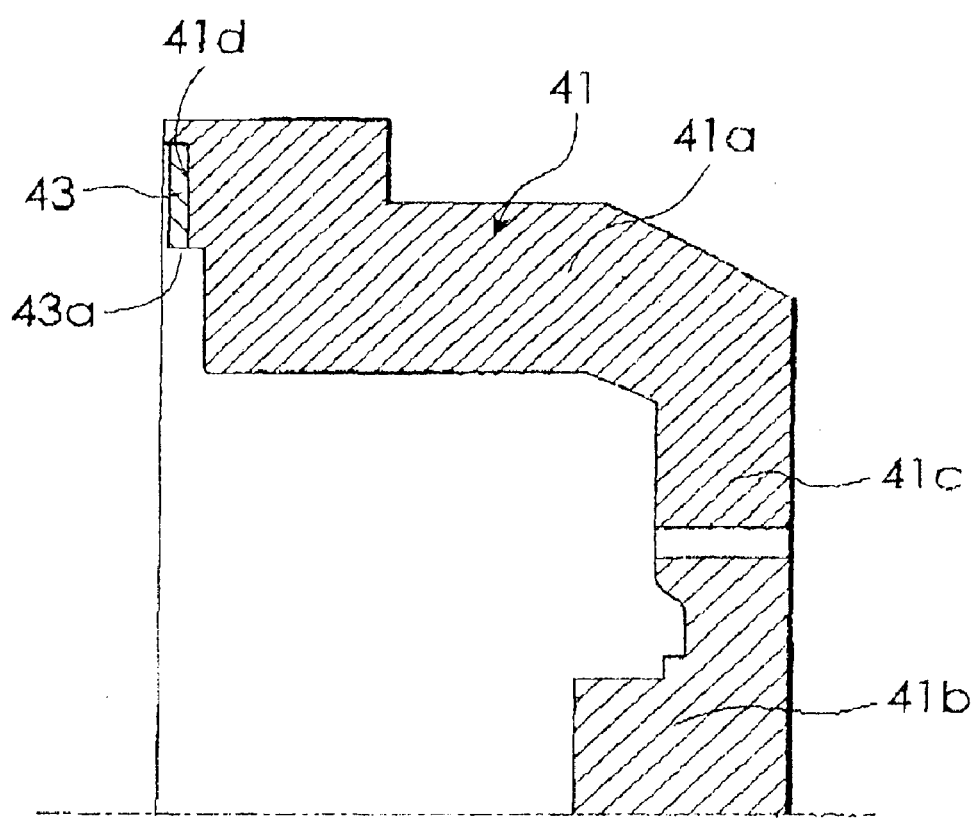
FIG. 4 is a diagram used for explaining a manufacturing method of the watertight brushless fan motor according to the embodiment of the present invention.
Figure 5:
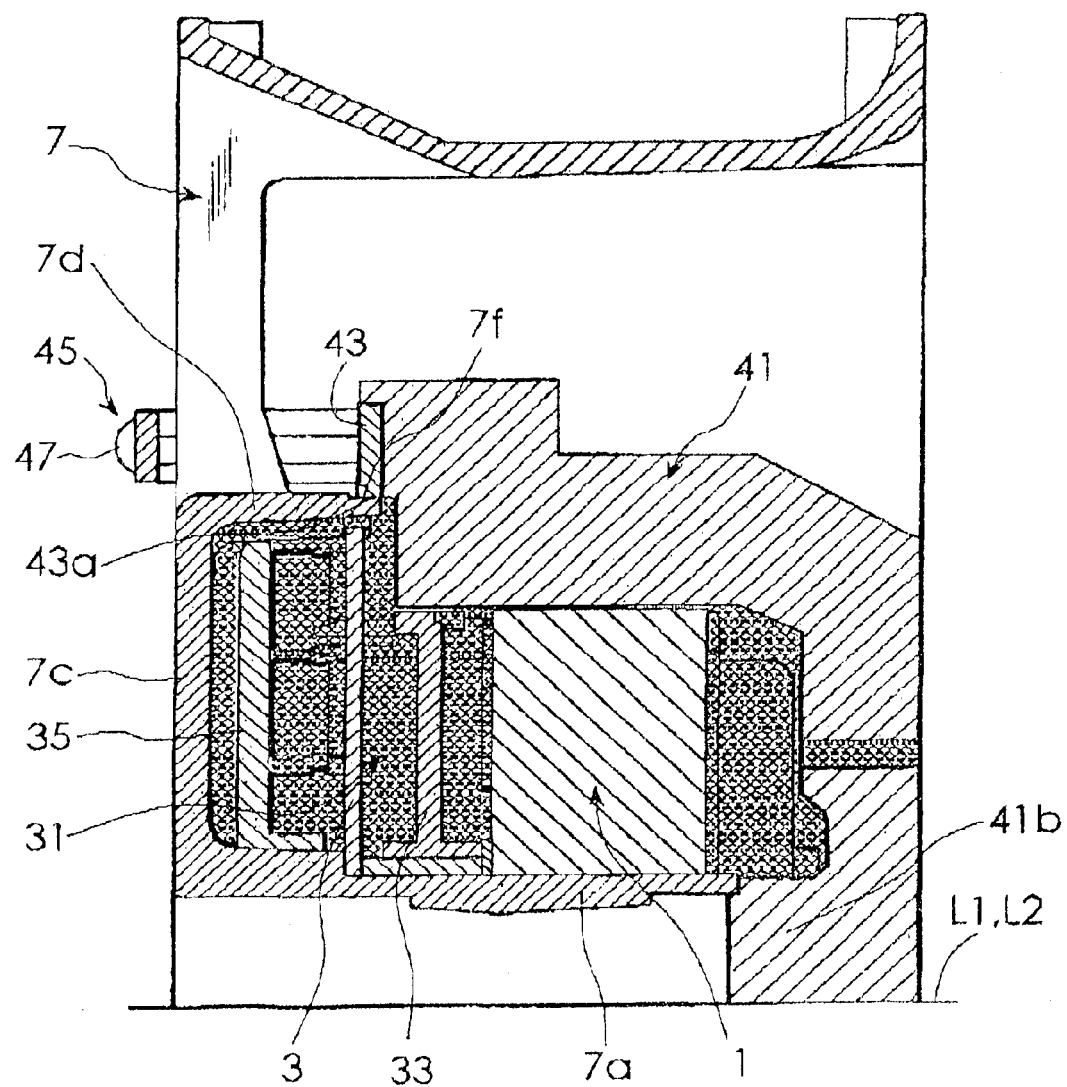
FIG. 5 is a diagram used for explaining the manufacturing method of the watertight brushless fan motor according to the embodiment of the present invention.

Next, a method of resin molding used in the embodiment of the present invention will be described. First, the stator 1, the circuit substrate 3, and the first pad 33 are combined to construct a stator assembly. Then, a die 41, an annular member 43, and a fixing jig 45 as illustrated in FIG. 5 are prepared. As illustrated in FIG. 4, the die 41 includes a cylindrical body 41a and a blockage wall 41c having an engaging portion 41b that can be engaged with the bearing supporting cylindrical section 7a of the case 7. The blockage wall 41c blocks one opening of the cylindrical body 41a. An annular end surface 41d of the cylindrical body 41a has three screw holes (not shown) in the circumferential direction thereof at equal intervals. The annular member 43 is made of a resin and has three through holes formed in positions corresponding to the positions of the screw holes of the die 41. The annular member 43 is ready for mounting at the annular end surface 41d of the die 41. As illustrated in FIG. 5, the annular member 43 has such a shape and dimension as to align a center line L1 of the cylindrical body 41a of the die 41 over a center line L2 of the bearing supporting cylindrical section 7a when the die 41 is fixed to the case 7. In this case, as illustrated in FIG. 5, an inner peripheral end surface 43a of the annular member 43 is brought into contact with an outer peripheral surface 7f of the outside cylindrical section 7d of the case 7, thereby allowing this arrangement. The fixing jig 45 can fix the die 41 and the annular member 43 to the case 7, and has three through holes corresponding to the three screw holes of the die 41.

The method of resin molding used in the embodiment of the present invention will be more specifically described below. First, as illustrated in FIG. 5, the second pad 35 and the stator assembly are fitted into the bearing supporting cylindrical section 7a of the case 7. Next, the annular member 43 is mounted to the die 41. Next, the bearing supporting cylindrical section 7a is engaged with the engaging portion 41b, and then the inner peripheral end surface 43a of the annular member 43 is brought into close contact with the outer peripheral surface 7f of the outside cylindrical section 7d of the case 7, thereby attaching the die 41 to the case 7.

Next, the die 41 and the annular member 43 are fixed to the case 7, using the fixing jig 45. Specifically, three screw holes of the die 41, three through holes of the annular member 43, and three through holes of the fixing jig 45 are aligned with one another. Thereafter, screws 47 pass through the respective through holes of the fixing jig 45 and the annular member 43, and then is screwed in the screw holes of the die 41, for fixing.

Next, the insulating resin made of the urethane resin is poured into the die 41 under low vacuum, thereby molding spaces between the plate-like section 7c and the bearing supporting cylindrical section 7a with the insulating resin in such a manner that the stator 1 and the circuit substrate 3 are included inside. Thus, the resin molding is completed. By performing molding with the resin according to this embodiment, the die 41 and the outside cylindrical section 7d of the case 7 can be sealed by the annular member 43 made of the resin. In addition, the insulating resin can be molded with the center line L1 of the cylindrical body 41a of the die 41 being aligned over the center line L2 of the bearing supporting cylindrical section 7a. For this reason, it is possible to prevent contact of the insulating resin with the rotor 5 caused by misalignment between the center line of the cylindrical body 41a of the die 41 and the center line of the bearing supporting cylindrical section 7a.

Further, the present invention is not limited to this embodiment, but various variations and modifications may be made without departing from the scope of the present invention.

What is claimed is:

1. A watertight brushless fan motor comprising:

a stator provided with a plurality of stator magnetic poles, each of which has a winding wound around each of a plurality of projecting pole portions of an iron core constituted by a plurality of laminated steel plates;

a circuit substrate mounted with electronic components constituting a control circuit for controlling a current flow through the winding, the circuit substrate being fixed to the stator, spaced from the projecting pole portions at a predetermined distance;

a rotor including a plurality of rotor magnetic poles, each of which is made of a permanent magnet, on an inner peripheral side thereof and including a plurality of blades on an outer peripheral side thereof;

a case including a bearing supporting cylindrical section in which a bearing for rotatably supporting a rotary shaft of the rotor is received, a cylindrical housing section for surrounding an outer periphery of the blades of the rotor, a plate-like section extending from an end of the bearing supporting cylindrical section in a direction perpendicular to a center line of the bearing supporting cylindrical section, spaced from the circuit substrate at a predetermined distance, and a plurality of webs for connecting the plate-like section to the housing section;

one or more pads disposed in at least one of a first space between the stator and the circuit substrate and a second space between the circuit substrate and the plate-like section of the case, and made or an electrical insulating material, for occupying a main portion of one of these spaces or both; and a molded part made of an insulating resin in such a manner that the stator, the circuit substrate, and the one or more pads are included therein.

2. The watertight brushless fan motor as claimed in claim 1, wherein one or more pads are disposed in the an outer surface of the molded part due to expansion and shrinkage of the insulating resin.

3. The watertight brushless fan motor as claimed in claim 1, wherein the molded part comprises a first molded part including the stator and a second molded part having such a shape and dimension that includes the circuit substrate and form a step portion for the first molded part, and wherein the shape and the dimension of the one or more pads disposed in the first space are defined to suppress occurrence of a crack at a boundary between the first molded part and the second molded part due to expansion and shrinkage of the insulating resin.

4. The watertight brushless fan motor as claimed in claim 1, wherein the one or more pads disposed in the first space comprise a single first pad, and wherein the first pad comprises a cylindrical section fitted into the bearing supporting cylindrical section and a plate-like section extending radially outward from the cylindrical section, and the plate-like section is formed with a plurality of slits into which part of windings of the stator magnet poles are inserted.

5. The watertight brushless fan motor as claimed in claim 4, wherein one or more curved surface extended sections, extending both in a circumferential direction of the bearing supporting cylindrical section and in a center line direction of the bearing supporting cylindrical section and having curved surfaces respectively curved along magnetic pole face of the projecting pole portions, are integrally formed at an end of the plate-like section located radially outward.

6. The watertight brushless fan motor as claimed in claim 5, wherein a length of the curved surface extended sections in the center line direction is corresponding to a portion of the first molded part facing the rotor, positioned on a side of the circuit substrate rather than on a side of the iron core.

7. The watertight brushless fan motor as claimed in claim 1, wherein the one or more pads disposed in the second space comprise a single second pad, and wherein the second pad comprises a cylindrical section fitted into the bearing supporting cylindrical section and a plate-like section extending radially outward.

8. The watertight brushless fan motor as claimed in claim 7, wherein a part of the electronic components are mounted at a back of the circuit substrate facing the plate-like section of the case, and wherein the plate-like section of the second pad is formed with at least one through hole for letting an electronic component large in size and dimension among the part of the electronic components pass therethrough.

9. The watertight brushless fan motor as claimed in claim 1, wherein the insulating resin is composed of a urethane resin.

* * * * *

UNITED STATES PATENT AND TRADEMARK OFFICE
CERTIFICATE OF CORRECTION

PATENT NO. : 6,798,091 B2
DATED : September 28, 2004
INVENTOR(S) : Naruhiko Kudou et al.

It is certified that error appears in the above-identified patent and that said Letters Patent is hereby corrected as shown below:

Column 8,
Line 53, delete "or" and insert therefore -- of --.
Line 60, after "in the" insert -- first space so as to prevent occurrence of a crack in --.

Column 9,
Line 23, delete "face" and insert therefore -- faces --.

Signed and Sealed this

Fifteenth Day of March, 2005

JON W. DUDAS
*Director of the United States Patent and Trademark Office*